Patented Mar. 23, 1926.

1,577,642

UNITED STATES PATENT OFFICE.

ALEXANDER JENNY AND JOHANNES ANGERSTEIN, OF BERLIN, GERMANY, ASSIGNORS, BY MESNE ASSIGNMENTS, TO AMERICAN ELECTRO-OSMOSIS CORPORATION, OF NEW YORK, N. Y., A CORPORATION OF DELAWARE.

MANUFACTURE OF GELATIN SUITABLE FOR EMULSIONS.

No Drawing. Application filed March 13, 1924. Serial No. 699,128.

*To all whom it may concern:*

Be it known that we, ALEXANDER JENNY and JOHANNES ANGERSTEIN, citizens of Switzerland and of The German State, residing at Berlin, Germany, W. 104 Corneliusstr. 1 and Berlin, Germany, W. 35 Genthinerstrasse 21, Germany, have invented certain new and useful Improvements in the Manufacture of Gelatin Suitable for Emulsions (for which we filed an application in Germany, January 31, 1923), of which the following is a specification.

In the preparation of photographic emulsions, considerable difficulty is usually experienced owing to the non-uniformity of the properties of the various kinds of gelatin. It is necessary for the technologist to test specially each gelatin preparation and to vary the recipe for preparing the emulsion according to the chemical and physical properties of the material. Frequently such tests indicate that the gelatin preparation is quite unsuited to the preparation of photographic emulsions.

The present invention is based on the observation that it is possible to employ a known electro-osmotic process of purification for converting gelatin which has been found unsuitable for the preparation of emulsions, into a product suitable for this purpose, if the gelatin, which has an acid reaction at the iso-electric point, is neutralized after submitting it to the said process of purification. On this observation is based also the knowledge that gelatin suitable for the production of emulsions must have a neutral reaction.

The process according to the invention consists in submitting an aqueous solution of gelatin to the action of an electric current between suitable diaphragms, and in neutralizing the gelatin liquor after the electro-osmotic purification is completed, that is, when the inorganic constituents have migrated through the diaphragms away from the gelatin liquor. The solution remaining in the middle chamber of the three-compartment apparatus becomes turbid owing to coagulation of albuminous matter. When the iso-electric-point is attained, and when a test portion of the solution gives no ash residue on heating, the current is discontinued and the liquid is neutralized, the albumen then passing again into solution.

For the neutralization, there may be employed the usual alkalies derived from the alkali metals, or the alkaline earths, or ammonia, in fact all substances having an akaline reaction.

It has also been found that the properties of the gelatin may be further improved. If it is desired to obtain a product of highly uniform chemical composition, which the technologist can only obtain by working according to a given recipe, the albumen, which becomes coagulated with the increasing migration of the inorganic ions and when the solution is in the neighborhood of the iso-electric-point, may be filtered off, and the clear solution thus obtained neutralized.

The products obtained according to the invention show a considerable improvement in their suitability for photographic emulsions, and are no longer prone to cause fogged negatives.

The following examples illustrate the invention:—

1. An aqueous solution of 10–20 per cent strength of gelatin unsuitable for emulsions, is submitted to the action of an electric current between diaphragms until free from inorganic constituents, the solution becoming turbid during the process owing to coagulation of albuminous bodies. The hydrogen ion concentration of the solution so treated is generally about $P_H = 4.7$ at the iso-electric point. When this point is attained, and a test portion of the liquid gives no ash residue on heating, the current is interrupted, and the faintly acid solution is neutralized by the addition of alkali.

2. An aqueous solution of gelatin of 15 per cent strength unsuitable for emulsions is submitted to the action of an electric current between diaphragms until the inorganic constituents have been removed. The process is complete after 6–8 hours and the completion is indicated by the low and constant amperage of the current. The albuminous bodies which have coagulated during the process are removed by filtration, and the clear filtrate is first neutralized with ammonia. The neutral gelatin thus obtained is free from albumen and ash, and on account of its homogeneous chemical composition is especially suitable for preparing photographic emulsions.

Having now particularly described and ascertained the nature of our said invention and in what manner the same is to be performed, we declare that what we claim is:—

1. The process of manufacturing gelatin which consists in subjecting an acid gelatin solution to the action of an electric current between diaphragms which separate the solution from the electrodes and thereafter neutralizing the solution.

2. The process of manufacturing gelatin suitable for emulsions which consists in subjecting a gelatin solution to electro-osmotic treatment and thereafter neutralizing the solution.

3. The process of manufacturing gelatin which consists in subjecting a gelatin solution to the action of an electric current between diaphragms which separate the solution from the electrodes, then removing coagulated albuminous matter from the solution and thereafter neutralizing the solution.

4. The process which consists in subjecting a gelatin solution to electro-osmotic treatment and then removing coagulated albuminous matter from the solution.

5. The process which consists in subjecting an acid gelatin solution to electro-osmotic treatment and then removing coagulated albuminous matter from the solution.

In testimony whereof we affix our signatures.

Dr. ALEXANDER JENNY.
Dr. JOHANNES ANGERSTEIN.